United States Patent [15] 3,648,837
Ogle [45] Mar. 14, 1972

[54] AUTOMOBILE ENGINE POWERED, LITTER EVACUATING DEVICE

[72] Inventor: David W. Ogle, Alderwood Manor, Wash.
[73] Assignee: Litco Enterprises, Inc., Alderwood Manor, Wash.
[22] Filed: Aug. 21, 1970
[21] Appl. No.: 65,897

[52] U.S. Cl. .................... 206/19.5 C, 15/313, 131/256
[51] Int. Cl. ............................. B60n 3/08, B60s 1/64
[58] Field of Search ............... 206/19.5 C, 19.5 B; 15/313

[56] References Cited

UNITED STATES PATENTS

| | | | |
|---|---|---|---|
| 3,230,567 | 1/1966 | Nickless | 15/313 |
| 3,062,363 | 11/1962 | Elswood | 206/19.5 C |
| 2,851,156 | 9/1958 | Thompson | 206/19.5 C |
| 2,461,174 | 2/1949 | Peterman | 15/313 X |

Primary Examiner—Leonard Summer
Attorney—Clinton L. Mathis

[57] ABSTRACT

There is disclosed a litter evacuating device for an engine driven automobile. Two airtight litter receptacles are shown, each having inlet and exhaust ports. One of the receptacles is for the evacuation of miscellaneous litter, as bottles, cans, refuse, garbage, paper, and the like type of litter from occupants of the automobile, and the other receptacle is for cigarette and cigar butts and ashes. A hingedly mounted, gravity closing door is mounted on the inlet port of one of the litter receptacles and the other is spring opened. Each litter receptacle feeds through conduit means to the inlet port of an airtight litter retention chamber. Each litter retention chamber has a screened exhaust port to prevent passage of litter out of the receptacle chamber therethrough. Also, the litter retention chamber for cigarette and cigar butts is formed with a removable bottom portion and has a water well in such bottom portion to extinguish the fire from any lit cigarette or cigar butt deposited therein. In one form, the litter retention chamber is detachably carried by the hood of an automobile and is raised and lowered therewith and is also attached and detached from the remainder of the mechanism during the raising and lowering of the hood. In the other form, the litter retention device extends downwardly and the bottom thereof is pivotally mounted with a foot operated discharge lever connected therewith. A negative pressure of suction is provided on the discharge port of the litter retention chamber by an exhaust fan powered by an idler pulley; an electrically responsive, selectively operable clutch means has a driving part connected with the idler pulley and a driven part connected with the exhaust fan; and belt means connects the idler pulley with the crankshaft of the automobile engine. Also, a suction inlet conduit is provided for the attachment thereto of a vacuum-type cleaning hose so that the interior of the automobile body may be vacuumed, when desired.

6 Claims, 3 Drawing Figures

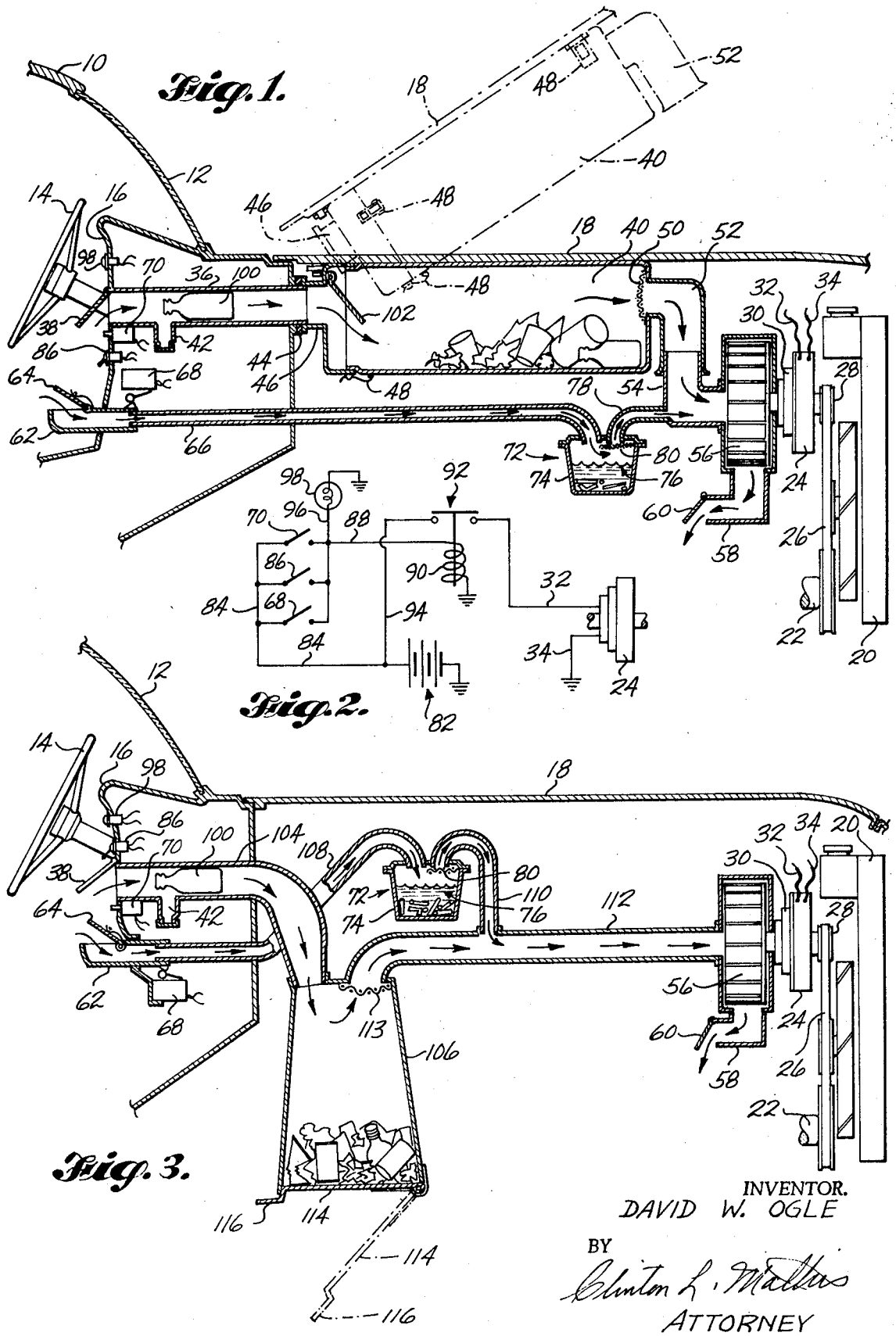

AUTOMOBILE ENGINE POWERED, LITTER EVACUATING DEVICE

SPECIFICATION

My invention relates to a litter evacuating device for an automobile powered by an internal combustion engine having a driven crankshaft. More particularly, my invention relates to an evacuation device for the collection of litter and trash of substantially all types which may result during the use of the automobile. Illustrative of such litter and trash are bottles, cans, papers, refuse, garbage, and cigarette and cigar butts and ashes.

While litter evacuation devices for automobiles have been heretofore conceived, such as that disclosed in U.S. Pat. No. 3,230,567, patented Jan. 25, 1966, yet the litter problem on our highways from automobiles has increased rather than decreased.

A problem of the prior art devices was that they could only take care of part of the litter and trash and with the result that some or all of the litter was thrown out of the vehicle and on to the highway roadside. The condition of the roadside of highways today is mute evidence of the need of a practical litter evacuation device for automobiles and one which the occupants of automobiles will use.

An object of my invention is to provide a device which is selectively powered by the driven crankshaft of the automobile engine and thus, one which provides adequate suction or negative pressure to draw or suck the various common litter items, previously mentioned, into a litter retention chamber for subsequent removal and depositing in suitable places.

Another object is to provide power means for providing such negative pressure providing means comprising an idler pulley; a selectively operable, electrically responsive, clutch means having a driving part connected to such idler pulley and a driven part connected with the negative pressure providing means; and belt means connecting the idler pulley with the crankshaft of the automobile engine.

Another object is to provide an airtight litter retention chamber having inlet and exhaust ports and which is mounted on the underside of the hood of an automobile engine. The said chamber moves with the hood, when the same is raised or lowered, and its inlet and discharge ports disconnect and connect, with such raising and lowering, respectively, from a litter receptacle for the infeeding of litter and an exhaust fan for providing the desired evacuation suction.

Another object is to provide a litter retention chamber having a removable bottom and a water well therein, whereby litter comprising lit cigarette and cigar butts will have the fire thereof extinguished.

Another object is to provide a litter receptacle having a swingingly mounted floor member movable from normal closed position to an open position in response to a foot operated lever.

Other objects of my invention will become explicit and implicit as the description of my invention proceeds in connection with the accompanying drawing, wherein like reference numerals refer to like parts, and wherein:

FIG. 1 is a fragmentary sectional view, with parts in elevation, showing an automobile equipped with my invention and showing from the area of the dash to the area of the radiator thereof;

FIG. 2 is a wiring diagram; and

FIG. 3 is a view similar to FIG. 1 of a modified form of my invention.

In the drawings, a conventional engine driven automobile is depicted by the fragmentary illustration of the following numbered parts thereof: roof 10, windshield 12, steering wheel 14, dash 16, hood 18, radiator 20, and driven pulley 22 connected with the crankshaft of the automobile. The said driven pulley is conventional and used to drive, through belt means, such devices as the engine fan, the water pump, the generator, the fluid pump for power brakes or steering, and the like. In my invention, the driven pulley 22 is also used to drive electrically responsive clutch member 24 through belt 26. Whenever the engine of the automobile is in operation and the clutch 24 is engaged, said clutch 24 has a driving part, illustrated by pulley 28, and a driven clutch part 30. When the conductors 32 and 34 are energized by a source of energy (as later explained in connection with FIG. 2 of the drawings), the driving and driven parts of the clutch 24 are engaged and when said conductors 32 and 34 are deenergized the said clutch parts are disengaged.

Now referring more particularly to the embodiment of my invention shown in FIG. 1, an airtight litter receptacle 36 has its inlet port disposed on dash 16. A hingedly mounted, gravity closing, inlet port door 38 is flush mounted on said dash 16. The door 38 is normally closed to sound deaden noise from the engine to the body interior of the automobile and to dampen odors which might otherwise tend to flow from the airtight litter retention chamber 40 back into the automobile body. Also, by manipulating the extent of opening of the door 38, the amount of air entering the receptacle 36 and chamber 40 may be regulated. A suction inlet conduit 42, provided with a removable cap, is preferably connected with the receptacle 36 for the attachment thereto of a vacuum cleaning hose so that, when desired, the device can also be used as a vacuum cleaning device for vacuum cleaning, such as the interior of an automobile body.

The exhaust port of the receptacle 36 connects with the inlet port of the chamber 40 through a two-part coupling member, a stationary part 44 being carried by the receptacle 36 and a movable part 46 thereof being carried by the chamber 40. Chamber 40 is detachably connected by a plurality of clamps 48 to the hood 18 of the automobile. The exhaust port of the chamber 40 is preferably covered by a screen 50 to ensure that litter drawn into the chamber 40 will remain there and will not be exhausted by a negative pressure at the exhaust port of chamber 40. Also, preferably, the exhaust port of chamber 40 connects with an elbow 52. Elbow 52 moves into an airtight seal with the fan inlet conduit 54 upon lowering of the hood 18 and such connection is broken upon the raising of hood 18. To compensate for engine movement from the usual rubber mounting, the elbow 52 may be made of elastic material. If it is desired to remove the chamber 40, to remove the litter therefrom, the hood 18 is raised to the dash line position shown in FIG. 1, the clamps 48 released, and then the chamber 40 may be removed from the automobile and moved to a suitable place for depositing the litter from chamber 40.

Negative pressure is provided in the fan inlet conduit 54 by a fan 56 having its inlet connected with conduit 54 and its exhaust connected with exhaust conduit 58. A gravity closing exhaust door 60 is normally closed and opens upon the discharge of air through the exhaust conduit 58.

Negative pressure of substantial value is necessary to provide the suction to evacuate litter of the various types commonly accumulating in automobiles today into a litter retention chamber, as chamber 40. Such litter comprises bottles, cans, refuse, garbage, and paper, to mention only some. If the source of power is an electric motor, the size necessary to do a satisfactory job will be so large as to cause a serious drainage problem on the storage battery of the automobile. Electric motor powered evacuating devices powered by the battery of the automobile have not proved satisfactory as litter evacuating devices.

I have provided rotary power to the fan 56 through clutch 24 from driven pulley 22 connected to the crankshaft of the engine of the automobile. Thus, the device can operate only when the engine is running and the speed of rotation of the exhaust fan 56, and the extent of the negative pressure created thereby, will depend upon the extent of acceleration or the engine speed. Thus, my device operates not only without any drainage on the storage battery of the automobile but as a matter of fact, operates with a charging of the storage battery if the condition of the battery and the regulator and the like permit.

Preferably an airtight cigarette and cigar butt receptacle 62 is also provided which is slidingly mounted in dash 16. A spring loaded lid 64 normally opens receptacle 62 for use of receptacle 62 as an ashtray. The receptacle 62 has a sliding sealing fit with conduit 66 and when the receptacle is pulled into the automobile body portion, as shown in FIG. 1 of the drawings, switch means 68 is electrically open. Upon sliding of receptacle 62 inward, switch means 68 is electrically closed causing fan 56 to operate as will be further explained in connection with FIG. 2.

As an alternative construction for the operation of an electrical switch, as switch 68, by the sliding of a receptacle, as 62, I have shown, in connection with receptacle 36, a switch means 70 normally in open position and moved to closed position upon the opening of the normally closed door 38. I prefer to use a switch means actuated by a sliding receptacle in connection with a cigar and cigarette ashtray as ashes are often deposited in such trays and cigarettes rested on such trays for some time prior to the evacuation of ashes and butts from the receptacle. Thus, I prefer an ashtray which has a partially open position so that it can be used as a normal ashtray and a fully open position wherein the position of the ashtray causes the closing of an electrical switch.

The discharge from conduit 66 connects with cigar-cigarette butts and ash litter retention chamber 72. The camber 72 has a removable bottom 74 with a water well therein below the liquid level 76. The exhaust conduit 78 is provided with a blocking screen 80, at its inlet, and connects with the negative pressure in fan inlet conduit 54.

In order to operate my device, the engine of the automobile must be running and thus causing pulley 22 to be driven by the crankshaft of the automobile engine. At the same time the belt 26 and the pulley 28 and the driving part of clutch 24 will be driven. The clutch 24 is of the type that is electrically responsive and closes upon energizing of conductors 32 and 34 and releases upon deenergizing of such conductors.

Referring now also to FIG. 2, the battery 82 of an automobile, having one grounded terminal is a suitable source of electricity. The other terminal of the battery 82 connects by conductor 84 with a plurality of electrical switches 68, 70, and 86 which are in electrical parallel relation with each other. Switch 68 is closed upon sliding of the cigar-cigarette receptacle to its furtherest extent inwardly; switch 70 is closed upon the opening of door 38; and switch 86 is mounted on dash 16 and is manually operable at any time desired.

Energy from a closed switch 68, 86 or 70 passes to conductor 88 and thence through coil 90 to complete the circuit and energize coil 90 of solenoid switch 92. Upon energizing of such coil 90, the switch 92 closes. Upon closing of switch 92, energy passes from the battery 82 to ground at one terminal and, at the other terminal, to conductor 94. Energy from conductor 94 passes through closed switch 92 to conductor 32, thence through the windings of clutch 24 to conductor 34, and thence to ground, completing the circuit and energizing clutch 24. Whenever conductor 88 is energized, conductor 96 is also energized and this energizes one terminal of pilot lamp 98 which has its other terminal grounded. Thus, whenever clutch 24 is energized this will be indicated by the illumination of pilot lamp 98.

After door 38 is opened and with sufficient engine speed, sufficient negative pressure is created so that litter, as the bottle 100, will be drawn into a receptacle 36. When desired, the extent of opening of the door 38 is regulated to decrease the amount of intake air with an increased air velocity. If cigarette or cigar litter is being evacuated from receptacle 62, then the adjustment may be made as to the extent of sliding open of the receptacle 62. As litter passes from the receptacle 36 to the chamber 40, the litter may engage and further open door 102. Door 102 closes by gravity and is opened by the negative pressure in the chamber 40. Thus, if said door 102 is not sufficiently opened by the negative pressure, litter such as the bottle 100 can further open said door 102 so that such litter can pass into the chamber 40. The door 102 also functions to reduce noise and odor exiting from the chamber 40 and into the interior of the automobile body.

Litter collected in the chamber 40 is retained therein in view of screen 50 on the exhaust port thereof. Also, litter collected in the retention chamber 72 will be held therein in view of the screen 80. If the cigarette or cigar butts are lit which enter the chamber 72, the fire thereof will be extinguished by the water below the liquid level 76 in the removable bottom 74 of the chamber 72.

To remove litter collected in the chamber 40, the hood 18 of the automobile is raised, the chamber 40 detached and then emptied into suitable containers. To remove litter from the chamber 72, the bottom 74 is removed, the contents discharged and then fresh water added up to the liquid level 76.

In illustrating the modified form of my invention in FIG. 3, I have numbered parts therein, also shown in FIG. 1, with the same numbers employed in connection with FIG. 1 and have thus incorporated the description of such parts without here repeating such description. Thus, there has been incorporated windshield 12, steering wheel 14, dash 16, hood 18, radiator 20, driven pulley 22, clutch 24, belt 26, pulley 28 (including therewith driving clutch part), driven clutch part 30, conductor 32, conductor 34, door 38, conduit 42, fan 56, exhaust 58, exhaust door 60, receptacle 62, lid 64, switch means 68, switch means 70, chamber 72, bottom 74, liquid level 76, screen 80, switch 86, pilot lamp 98, and bottle 100.

In FIG. 2 parts are shown replacing parts of FIG. 1 as follows: airtight litter receptacle 104 replacing receptacle 36; litter retention chamber 106 replacing chamber 40; conduit 108 replacing conduit 66; exhaust conduit 110 replacing conduit 78; fan inlet conduit 112 replacing conduit 54; and screen 113 replacing screen 50. The primary change between the structures of FIGS. 1 and 3 is that in FIG. 1 the litter retention chamber 40 is detachably mounted on the underside of the hood 18, while in FIG. 3, the litter retention chamber 106 is mounted on the automobile and has its discharge door 114 located so that a foot lever 116 is conveniently located for foot operation thereof. This primary change brings changes in the above mentioned replacement parts which changes are primarily those of shapes. Also, in FIG. 2, the gravity closing door 102 is not shown. If desired, such door and its function may be incorporated in the structure of FIG. 3. The wiring diagram of FIG. 2 is equally applicable to the structure of FIG. 3.

From the foregoing, it will now be apparent that I have provided a litter evacuation device for an engine driven automobile comprising an airtight litter receptacle (36 or 104) having inlet and exhaust ports; a hingedly mounted, gravity closing door 38 mounted on the inlet port of the receptacle 36 and a spring loaded lid 64 for the other receptacle 62 to permit deposit of litter in either receptacle. Thereafter, the door or lid is movable toward closed position to control the inlet of air into the receptacle through the inlet port covered to selective amounts by the door 38 or lid 64. Also, the door 38, being normally closed, tends to dampen engine noises and the feedback of gases through the inlet port and into the automobile. Also, I have provided an airtight litter retention chamber (40 or 106) having inlet and exhaust ports and screen means (50 or 113) to limit the exhaust through the screen to gases and thus eliminate passage of litter therethrough. Next, conduit means (as stationary part 44 and movable part 46 of a coupling device) connects between the exhaust of the litter receptacle 36 and the inlet of the litter retention chamber 40. An exhaust fan 56 is disposed in an airtight housing with the air inlet thereof (54 or 112) connected with the exhaust of the litter retention chamber (40 or 106) and with the exhaust 58 of the fan 56 discharging to the atmosphere. The clutch 24 has a driving part connected with an idler pulley 28 connected by belt means 26 to the crankshaft of the automobile engine and the clutch 24 has a driven part 30 connected with the rotor of the exhaust fan 56.

In the form of my invention shown in FIG. 1, the litter receptacle 40 is mounted on the underside of the hood 18 of the automobile by detachable means (clamps 48), and the mounting means disengage upon raising of the automobile hood 18 and engage upon the lowering of said hood. Also, the connection (elbow 52) between the exhaust port of the litter retention chamber 40 and the connection (fan inlet conduit 54) to the exhaust fan 56 disengages upon the raising of the hood 18 and engages upon the lowering of such hood.

In both FIGS. 1 and 2, the litter retention chamber 72 for cigar-cigarette ashes and butts has a removable bottom 74 and a water well therein indicated by the liquid level 76.

In FIG. 3, the litter retention chamber 106 has a swingingly mounted floor 114 selectively movable to a normal closed position (full line position shown in FIG. 3) to an open litter discharge position (dash line position shown in FIG. 3). Also, said swingingly mounted floor 114 has a foot operated lever 116 connected therewith. A gravity closing door 102 is disposed at the inlet port of an airtight litter retention chamber 40 and opens by air or litter entering the said chamber and the door 102 closes by gravity and is an aid in baffling noise and odor from backfeeding from the chamber 40 through the inlet port of such chamber and into the automobile.

Obviously, changes may be made in the forms, dimensions, and arrangements of the parts of my invention without departing from the principal thereof, the above setting forth only preferred forms of embodiment of my invention.

I claim:

1. A litter evacuating device for an engine driven automobile comprising an airtight litter receptacle having inlet and exhaust ports; a door mounted on said inlet receptacle port, movable to open position to permit deposit of litter therein and movable toward closed position to control passage of air through the receptacle and to dampen passage of noise through the receptacle; an airtight litter retention chamber having inlet and exhaust ports and screen means over the exhaust port to limit the exhaust therethrough to gases; conduit means connected between the exhaust port of the litter receptacle and the inlet port of the litter retention chamber; an exhaust fan disposed in an airtight housing with the air inlet thereof connected with the exhaust port of the litter retention chamber, and the exhaust thereof discharging to the atmosphere; an idler pulley; a selectively operable clutch means comprising a driving part connected with said idler pulley and a driven part connected with said exhaust fan; and belt means connecting said idler pulley with the crankshaft of the automobile engine.

2. The combination of claim 1, wherein the automobile is also equipped with an engine hood and where said litter receptacle retention chamber comprises a chamber detachably mounted on the underside of the engine hood; the conduit means between the exhaust port of the litter receptacle and the inlet port of the litter retention chamber disengages upon raising of the automobile hood and engages upon the lowering of the engine hood; and the connection between the exhaust port of the litter retention chamber and the airtight housing of the exhaust fan also disengages upon the raising of the engine hood and engages upon the lowering of the engine hood.

3. The combination of claim 1, wherein the litter retention chamber comprises a chamber having a removable bottom and a water well therein, whereby the litter comprising lit cigarette and cigar butts will have the fire thereof extinguished by water in said water well.

4. The combination of claim 1, wherein a gravity closing door is mounted adjacent the inlet port of the litter retention chamber and is hung to be opened by litter or air entering said retention chamber and passing said door.

5. The combination of claim 1, wherein the litter retention chamber comprises a swingingly mounted floor selectively movable from normal closed position to open litter discharge position.

6. The combination of claim 5, wherein a foot operated lever connects with said floor.

* * * * *